(12) United States Patent
Hartlaub

(10) Patent No.: US 9,902,302 B2
(45) Date of Patent: Feb. 27, 2018

(54) MOTOR VEHICLE SEAT

(71) Applicant: Johnson Controls Technology Company, Plymouth, MI (US)

(72) Inventor: Silvio Hartlaub, Pulheim (DE)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 15/039,193

(22) PCT Filed: Nov. 17, 2014

(86) PCT No.: PCT/EP2014/074792
§ 371 (c)(1),
(2) Date: May 25, 2016

(87) PCT Pub. No.: WO2015/078718
PCT Pub. Date: Jun. 4, 2015

(65) Prior Publication Data
US 2017/0158099 A1    Jun. 8, 2017

(30) Foreign Application Priority Data

Nov. 27, 2013 (DE) .......... 10 2013 224 194

(51) Int. Cl.
*B60N 2/48* (2006.01)
*B60N 2/58* (2006.01)

(52) U.S. Cl.
CPC .......... *B60N 2/4808* (2013.01); *B60N 2/4805* (2013.01); *B60N 2/4885* (2013.01); *B60N 2/58* (2013.01); *B60N 2002/4888* (2013.01)

(58) Field of Classification Search
CPC .. B60N 2/4805; B60N 2/4808; B60N 2/4885; B60N 2/58
See application file for complete search history.

(56) References Cited

U.S. PATENT DOCUMENTS

| | | | |
|---|---|---|---|
| 4,744,601 A | 5/1988 | Nakanishi | |
| 7,090,292 B2* | 8/2006 | Dellanno | ........ B60N 2/42709 297/216.12 |
| 8,052,210 B2* | 11/2011 | Marsden | ........... B60N 2/2851 297/216.11 |

(Continued)

FOREIGN PATENT DOCUMENTS

| | | |
|---|---|---|
| DE | 196 43 266 C1 | 5/1998 |
| DE | 100 45 070 A1 | 3/2002 |

(Continued)

OTHER PUBLICATIONS

Korean Office Action dated Jan. 16, 2017.

*Primary Examiner* — Philip F Gabler
(74) *Attorney, Agent, or Firm* — McGlew and Tuttle, P.C.

(57) ABSTRACT

A motor vehicle seat (1) includes a backrest (3) and a headrest (2) which has a headrest body (2.1) which contains at least one filling material (2.1.2). The headrest body (2.1) is coupled to the backrest (3) by means of a maintaining element (2.2). The headrest body (2.1) can be axially moved automatically with respect to the backrest (3), at least in areas of a contact surface between a head of a passenger (A) and the headrest body (2.1). A sliding device (5) is introduced into at least one section between the maintaining element (2.2) and the filling material (2.1.2).

20 Claims, 2 Drawing Sheets

(56) References Cited

U.S. PATENT DOCUMENTS

| | | | | |
|---|---|---|---|---|
| 2010/0282902 | A1* | 11/2010 | Rajasingham | B60N 2/01 244/118.6 |
| 2013/0278028 | A1* | 10/2013 | Gaeng | B60N 2/4882 297/216.12 |
| 2014/0217788 | A1* | 8/2014 | Norwood | B60R 21/233 297/216.12 |

FOREIGN PATENT DOCUMENTS

| | | |
|---|---|---|
| DE | 101 33 414 A1 | 1/2003 |
| DE | 103 35 268 B3 | 12/2004 |
| EP | 13 29 356 A2 | 7/2003 |
| JP | H07-265164 A | 10/1995 |
| JP | 2008-149862 A | 7/2008 |
| JP | 2013-169945 A | 9/2013 |
| WO | 2012079762 A1 | 6/2012 |
| WO | 2013/034332 A2 | 3/2013 |

* cited by examiner

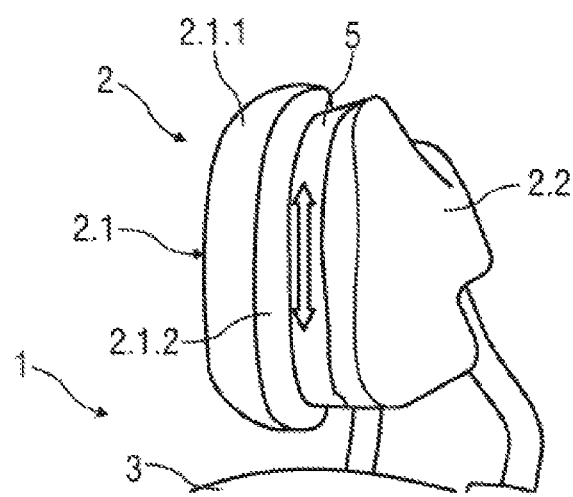
FIG 2
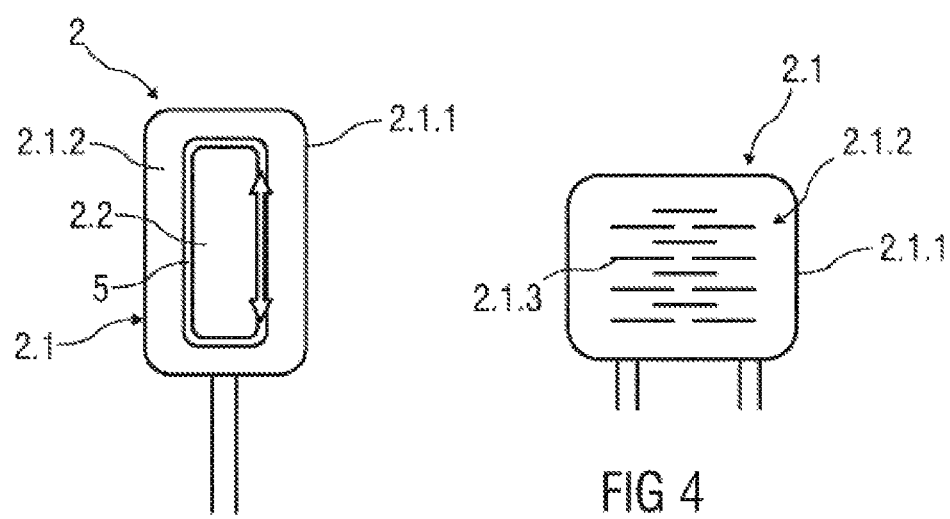
FIG 3
FIG 4

MOTOR VEHICLE SEAT

CROSS REFERENCE TO RELATED APPLICATIONS

This application is a United States National Phase Application of International Application PCT/EP2014/074792 filed Nov. 17, 2014 and claims the benefit of priority under 35 U.S.C. § 119 of German Application 10 2013 224 194.1 filed Nov. 27, 2013 the entire contents of which are incorporated herein by reference.

FIELD OF THE INVENTION

The invention relates to a vehicle seat having a backrest and a headrest which comprises a headrest body.

BACKGROUND OF THE INVENTION

Vehicle seats with height-adjustable headrests are sufficiently known from the prior art. For example, WO 2013/034332 A2 discloses a height-adjustable arrangement of a headrest on a vehicle seat. In this instance, the headrest or at least a headrest cushion of the headrest is secured to a sliding receiving member of a height adjustment mechanism so as to be fixed to a frame by means of a receiving plate, wherein the sliding receiving member is arranged so as to be displaceable in terms of height by means of at least two actuation cables which act in opposite directions on the sliding receiving member on at least one guiding element of the height adjustment mechanism which is arranged in or on a retention element of the headrest.

DE 103 35 268 B3 discloses a divided headrest for the seat of a motor car having two carrier portions, wherein a first carrier portion is receivable by means of headrest rods in a receiving member of the backrest of the seat and wherein both carrier portions are provided with a cushion and have two relative positions. In a first position, the second carrier portion is arranged close to the first carrier portion substantially at the same height as the first carrier portion. In a second position, the second carrier portion is remote from the first carrier portion in the vehicle direction and raised relative thereto. In this instance, the headrest comprises a locking element by means of which the first carrier portion is fixed in the first position.

Furthermore, headrests of a vehicle seat are described in DE 101 33 414 A1, DE 196 43 266 C1 and DE 100 45 070 A1.

SUMMARY OF THE INVENTION

An object of the present invention is to provide a vehicle seat which is improved with respect to the prior art.

In a vehicle seat having a backrest and a headrest which comprises a headrest body, the headrest body has at least one filling material, wherein the headrest body is automatically axially movable relative to the backrest at least in the region of a contact face between a head of a vehicle occupant and the headrest body, and wherein the headrest body is connected to the backrest via a retention element. According to the invention, there is provided a sliding medium which is introduced in at least one portion between the retention element and the filling material.

The retention element is, for example, arranged so as to be axially displaceable in the backrest so that the headrest is constructed in particular so as to be adjustable in terms of height.

The automatic axial relative movement of the headrest body at least in the region of the contact face corresponds in this instance to an increase of the longitudinal extent of the headrest body, that is to say, an expansion or a partial movement of the headrest body in the longitudinal extent thereof.

In the event of a rear-end collision of the vehicle, the vehicle occupant is intercepted by the vehicle seat, in particular by the backrest and the headrest, wherein, when the vehicle occupant strikes the backrest, a force pulse is introduced into the backrest and optionally into the headrest body and, as a result of a movement energy of the vehicle occupant and/or a lowering of the backrest in the vertical direction of the vehicle, there may be carried out an upward axial movement of the vehicle occupant in the vertical direction of the vehicle, which, as a result of a high pushing resistance between the head of the vehicle occupant and the headrest body may lead to a rotation of the head relative to the body in the direction of the headrest body and consequently to high loads of the rear of the head and the cervical spine of the vehicle occupant.

The axial relative movement of the headrest body in the longitudinal extent thereof is in this instance dependent on the force pulse introduced, wherein the headrest body at least in the region of a contact face between the head of the vehicle occupant and the headrest body follows the above-described axial movement of the vehicle occupant and consequently an axial movement of the head of the vehicle occupant. That is to say: the headrest body is at least in the region of the contact face moved or extended upward or downward in accordance with a movement direction of the vehicle occupant. Consequently, a pushing resistance which acts on the contact face of the headrest body as a result of the movement of the vehicle occupant can be reduced so that biomechanical loads, in particular on the head and on the cervical spine of the vehicle occupant, can be reduced. The axial relative movement of the headrest body in this instance cannot be determined or adjusted by the vehicle occupant himself.

According to an embodiment of the headrest body, it has a headrest cover which surrounds the filling material.

According to an embodiment, the filling material is preferably formed from a resilient material, such as, for example, foam and provided with at least one recess at a front and/or upper and/or lateral surface, whereby an automatic, axial relative movement of the filling material in the longitudinal extent of the headrest body is improved. In addition, a weight of the headrest body is decreased in this instance. For example, the filling material has a large number of recesses which are introduced in the form of horizontal or vertical notches in the front surface, that is to say, the surface facing the vehicle occupant. Alternatively, the filling material may also have a comparatively extensive recess in the region of the contact face, whereby it is weakened in the front region of the headrest body, in particular centrally. The term recess may in this instance also be understood to be a tapering and/or a thickness reduction of the filling material. The headrest cover is preferably formed at least in the region of the contact face from a resilient material so that a common automatic relative movement of the filling material and the headrest cover is possible in the longitudinal extent of the headrest body. The axial relative movement of the filling material in this instance corresponds to an extension of the filling material in an axial direction, in particular in the longitudinal extent of the headrest body.

Preferably, the retention element is formed from a predeterminable, flexurally rigid material, for example, from a plastics material, so that an automatic axial movement of the filling material and optionally the headrest cover in the longitudinal extent of the headrest body relative to the retention element is possible.

In all the embodiments described above, the headrest cover and/or the filling material are at least in the region of the contact face preferably formed from a resilient material.

The sliding medium is, for example, a lubricant and/or a sliding film, by means of which a pushing resistance between the head of the vehicle occupant and the contact face of the headrest body can be minimized. It is also conceivable to form the filling material at least partially from a lubricant foam which forms the sliding medium.

In another embodiment of the invention, there is provided an additional sliding medium which is introduced in at least one portion between the filling material and the headrest cover so that the headrest cover and the filling material are automatically axially movable relative to the backrest at least in the region of the contact face. As a result of the fact that two components of the headrest body are axially movable, an improved reduction of the pushing resistance on the contact face of the headrest body is possible.

It is also possible according to an alternative to the invention for the sliding medium to be arranged only in at least one portion between the filling material and the headrest cover and for no sliding medium to be introduced between the retention element and the filling material. This alternative embodiment can be combined with all the above-mentioned embodiments and can be produced in a particularly simple manner.

Embodiments of the invention are explained in greater detail below with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic, perspective partially sectional illustration of the headrest of the vehicle seat;

FIG. 3 is a schematic sectioned side view of the headrest according to FIG. 2, and FIG. 4 is an additional schematic sectioned front view of a headrest in an exemplary embodiment.

DESCRIPTION OF THE PREFERRED EMBODIMENTS

Figure 1:
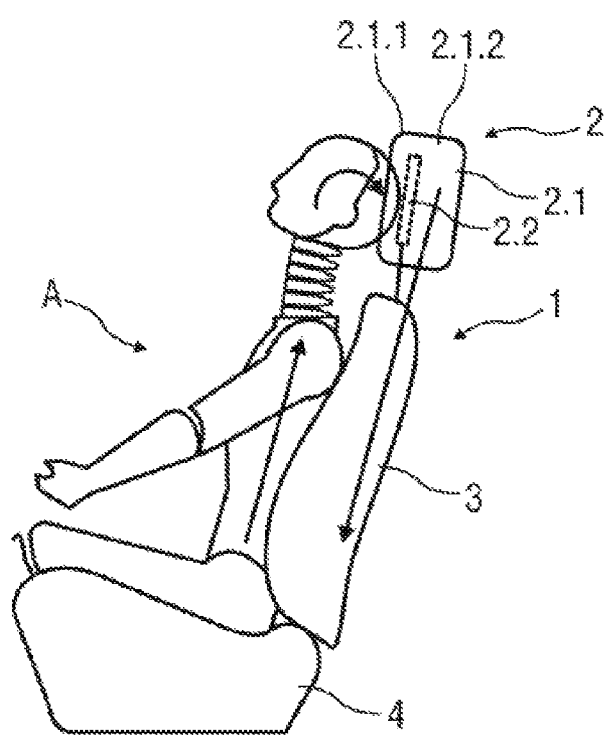
FIG. 1 is a schematic side view of a vehicle seat having a headrest and a vehicle occupant who is arranged on the vehicle seat.

Referring to the drawings, components which correspond to each other are given the same reference numerals in all the Figures.

FIG. 1 is a side view of a vehicle seat 1 of a vehicle which is not illustrated in greater detail having a headrest 2 which is illustrated in a semi-transparent manner, a backrest 3 and a seat member 4.

The headrest 2 comprises in the present embodiment a headrest body 2.1 and a retention element 2.2 which retains the headrest body 2.1 and which is illustrated with broken lines in the present illustration and which is preferably formed from a flexurally rigid material, such as, for example, plastics material. For example, the retention element 2.2 is formed from two round rods and arranged at an upper end of the backrest 3. The retention element 2.2 is in this instance axially insertable into correspondingly shaped receiving means in the backrest 3 so that, depending on an introduction depth of the retention element 2.2, a height of the headrest 2 is manually or electronically adjustable by a vehicle occupant A. Alternatively, the retention element 2.2 may also be shaped in a box-like manner and/or formed from a hard foam.

At an outer side of the headrest body 2.1, there is provided a headrest cover 2.1.1 which delimits an inner space of the headrest body 2.1. The inner space is filled with a filling material 2.1.2, for example, a foam.

A vehicle occupant A is located on the vehicle seat 1. In this instance, the present view shows in particular a position of the vehicle occupant A on the vehicle seat 1 after a rear-end collision of the vehicle.

As already described in the introduction, a vehicle occupant A is intercepted after a rear-end collision of the vehicle by means of the vehicle seat 1, in particular by means of the backrest 3 and the headrest 2, wherein a force pulse is introduced into the backrest 3 and where applicable into the headrest body 2.1 and, as a result of a movement energy of the vehicle occupant A and/or a lowering of the backrest 3 in the vertical direction of the vehicle, there is carried out an upward axial movement of the vehicle occupant A in the vertical direction of the vehicle, which is indicated by means of a linear arrow which points in the direction of the headrest 2. A pushing resistance which acts in this instance between the head of the vehicle occupant A and the headrest body 2.1 can lead to a rotation of the head relative to the body in the direction of the headrest body 2.1 and consequently to high loads of the rear of the head and the cervical spine of the vehicle occupant A which is illustrated in the present illustration with a bent arrow.

In order to reduce the pushing resistance and consequently to reduce biomechanical loads on the head and on the cervical spine of the vehicle occupant A in the event of rear-end collisions, the headrest body 2.1 is automatically movable axially relative to the retention element 2.2, in particular in the longitudinal extent of the headrest 2, when the vehicle occupant A is intercepted and a resultant movement thereof in the vertical direction of the vehicle at least in the region of a contact face between the head of the vehicle occupant A and the headrest body 2.1.

In addition, FIGS. 2 and 3 show an embodiment of the headrest 2 according to the invention, wherein the headrest 2 is illustrated in FIG. 2 as a perspective, partially sectioned illustration. FIG. 3 is a sectional illustration of the headrest 2 according to FIG. 2, in particular in cross-section.

Between the filling material 2.1.2 and the retention element 2.2 there is arranged in this instance a sliding medium 5 which is constructed, for example, as a sliding gel, a lubricant oil or as a sliding film. Consequently, a friction coefficient between the filling material 2.1.2 and the retention element 2.2 is reduced so that the headrest cover 2.1.1 and the filling material 2.1.2 are automatically movable relative to the retention element 2.2 in the longitudinal extent of the headrest body 2.1.

The automatic axial relative movement of the filling material 2.1.2 corresponds in this instance to an extension of the filling material 2.1.2 in the axial direction, in particular in the longitudinal orientation of the headrest 2, as illustrated in FIGS. 2 and 3 with a double-headed arrow.

The axial relative movement of the headrest cover 2.1.1 corresponds to an extension thereof in the longitudinal extent of the headrest 2, in particular in the vertical direction of the vehicle.

Furthermore, the headrest cover 2.1.1 is at least in the region of the contact face formed from a resilient material, for example, a material of polyamide, which preferably has a very low elasticity modulus.

A pushing resistance between the head of the vehicle occupant A and the headrest cover 2.1.1 can consequently be reduced so that the extension of the headrest cover 2.1.1 can at least partially follow an axial movement of the vehicle occupant A and consequently a movement of the head of the vehicle occupant A in accordance with the elasticity modulus after a rear collision.

FIG. 4 shows another possible embodiment of the headrest 2, wherein the headrest body 2.1 is a sectioned illustration, in particular in longitudinal section.

The filling material 2.1.2 has at the front surface side a large number of recesses 2.1.3 which are introduced into the filling material 2.1.2 as horizontal notches. Alternatively, the recesses 2.1.3 may also be constructed in any other suitable form.

The recesses 2.1.3 bring about a corresponding weakening of the filling material 2.1.2 on the front surface side so that an extension of the filling material 2.1.2—with respect to a filling material 2.1.2 without such recesses 2.1.3—is facilitated.

In another embodiment which is not shown, there is arranged between the filling material 2.1.2 and the headrest cover 2.1.1 an additional sliding medium which is also constructed as a sliding gel, a lubricant oil or as a sliding film. In this instance, the sliding medium 5 between the filling material 2.1.2 and the retention element 2.2 and the additional sliding medium between the filling material 2.1.2 and the headrest cover 2.1.1 may be constructed identically or differently. For example, both sliding media 5 are constructed as a sliding film.

Furthermore, it is also possible to form the filling material 2.1.2 at least partially from a sliding foam which forms the sliding medium 5. In this instance, it is also possible for an axial relative movement of the filling material 2.1.2 to correspond to a movement directed in the longitudinal extent of the headrest 2 in respect of a component of the filling material 2.1.2, which component faces the vehicle occupant A.

While specific embodiments of the invention have been shown and described in detail to illustrate the application of the principles of the invention, it will be understood that the invention may be embodied otherwise without departing from such principles.

The invention claimed is:

1. A vehicle seat comprising:
    a backrest;
    a headrest which comprises a headrest body which has at least one filling material;
    a retention element, wherein the headrest body is connected to the backrest via the retention element and the headrest body is automatically axially movable relative to the backrest at least in a region of a contact face between a head of a vehicle occupant and the headrest body; and
    a sliding medium provided in at least one portion between the retention element and the filling material such that the filling material is automatically movable with respect to the retention element at least in the region of the contact face in a longitudinal extent of the headrest body, the longitudinal extent extending in a vertical direction of a vehicle.

2. The vehicle seat as claimed in claim 1, wherein the headrest body is axially movable relative to the backrest at least in the region of the contact face by a force pulse which acts on the backrest or the headrest body or the backrest and the headrest body.

3. The vehicle seat as claimed in claim 1, wherein the filling material is automatically axially movable relative to the backrest at least in the region of the contact face.

4. The vehicle seat as claimed in claim 1, wherein the filling material is provided at a front surface or at an upper surface or at a lateral surface or at any combination of a front surface and an upper surface and a lateral surface with at least one recess.

5. The vehicle seat as claimed in claim 1, wherein the retention element is formed from a predeterminable, flexurally rigid material.

6. The vehicle seat as claimed in claim 1, further comprising a headrest cover wherein the headrest cover or the filling material is formed at least in the region of the contact face from a resilient material or both the headrest cover and the filling material is formed at least in the region of the contact face from a resilient material.

7. The vehicle seat as claimed in claim 1, wherein the sliding medium is constructed as a sliding film, a sliding gel or a lubricant.

8. The vehicle seat as claimed in claim 1, further comprising:
    a headrest cover;
    an additional sliding medium which is introduced in at least one portion between the filling material and the headrest cover.

9. A vehicle seat comprising:
    a backrest;
    a headrest comprising a headrest body, the headrest body comprising a filling material;
    a retention element, the headrest body being connected to the backrest via the retention element, the headrest body being automatically axially movable relative to the backrest at least in a region of a contact face between a head of a vehicle occupant and the headrest body; and
    a sliding medium between the retention element and the filling material, the sliding medium providing a frictional force between the retention element and the filling material, wherein the frictional force maintains the filling material in position during a non-accident state of the headrest, the headrest body being movable relative to the retention element via the sliding medium upon the headrest body receiving a force pulse that is greater than the frictional force in an accident state of the headrest such that the filling material is automatically movable with respect to the retention element at least in the region of the contact face in a longitudinal extent of the headrest body, the longitudinal extent extending in a direction relative to a traveling direction of a vehicle.

10. The vehicle seat as claimed in claim 9, wherein the headrest body is axially movable relative to the backrest at least in the region of the contact face by the force pulse which acts on the backrest or the headrest body or the backrest and the headrest body.

11. The vehicle seat as claimed in claim 9, wherein the filling material is automatically axially movable in the vertical direction relative to the backrest at least in the region of the contact face.

12. The vehicle seat as claimed in claim 9, wherein the filling material is provided at a front surface or at an upper surface or at a lateral surface or at any combination of a front surface and an upper surface and a lateral surface with at least one recess.

13. The vehicle seat as claimed in claim 9, wherein the retention element is formed from a predeterminable, flexurally rigid material.

14. The vehicle seat as claimed in claim 9, further comprising a headrest cover, wherein the headrest cover or the filling material is formed at least in the region of the contact face from a resilient material or both the headrest cover and the filling material is formed at least in the region of the contact face from a resilient material.

15. The vehicle seat as claimed in claim 9, wherein the sliding medium comprises a sliding film, a sliding gel or a lubricant.

16. A vehicle seat comprising:
a vehicle seat structure comprising a backrest, a headrest connected to the backrest and a retention element, the headrest comprising a headrest body, the headrest body comprising a filling material and a sliding medium, the retention element connecting the headrest body to the backrest, the sliding medium being in contact with the retention element and the filling material, the sliding medium reducing a frictional contact force between the retention element and the filling material, wherein the headrest body is automatically axially movable relative to the backrest at least in a region of a contact face between a head of a vehicle occupant and the headrest body upon the headrest receiving a pulse force during a vehicle accident that generates an axial force relative to a longitudinal axis of the backrest that is greater than the frictional contact force such that the filling material is automatically movable with respect to the retention element at least in the region of the contact face in a longitudinal extent of the headrest body, the longitudinal extent extending in a vertical direction of the vehicle seat structure.

17. The vehicle seat as claimed in claim 16, wherein the headrest body is axially movable relative to the backrest at least in the region of the contact face by the force pulse which acts on the backrest or the headrest body or the backrest and the headrest body.

18. The vehicle seat as claimed in claim 16, wherein the filling material is automatically axially movable relative to the backrest at least in the region of the contact face.

19. The vehicle seat as claimed in claim 16, wherein the filling material is provided at a front surface or at an upper surface or at a lateral surface or at any combination of a front surface and an upper surface and a lateral surface with at least one recess.

20. The vehicle seat as claimed in claim 16, wherein the headrest comprises a headrest cover and another sliding medium, the another sliding medium being in contact with headrest cover and the another sliding medium.

* * * * *